Patented Sept. 17, 1946

2,407,848

UNITED STATES PATENT OFFICE 2,407,848

PRODUCTION OF CYANOALKENES

Gardner C. Ray, Bartlesville, Okla., assignor to Phillips Petroleum Company, a corporation of Delaware No Drawing. Application July 1, 1944, Serial No. 543,212

4 Claims. (Cl. 260—464)

The present invention relates to a process for the production of nitriles of unsaturated aliphatic carboxylic acids (cyanoalkenes) and relates to such a process in which a dicyanoalkane is pyrolyzed or thermally decomposed to yield hydrogen cyanide and the corresponding cyanoalkene. In one of its more specific aspects, the invention relates to a process for the production of acrylonitrile from succinonitrile.

It is an object of the present invention to provide a process for the production of nitriles of unsaturated aliphatic carboxylic acids (cyanoalkenes) from dicyanoalkanes.

It is another object of the present invention to provide a process for the production of acrylonitrile from succinonitrile.

Another object of the present invention is to provide catalysts for the pyrolysis or thermal decomposition of dicyanoalkanes to produce cyanoalkenes with the liberation of hydrogen cyanide.

Another object of the invention is to provide a process capable of producing optimum yields of cyanoalkenes by pyrolysis of dicyanoalkanes.

Other objects and advantages of the invention, some of which are referred to specifically hereinafter, will be apparent to those skilled in the art to which the invention pertains.

In accordance with my invention, succinonitrile (dicyanoethane, butane-dinitrile, ethylene dicyanide, NC—CH$_2$—CH$_2$—CN) is pyrolyzed or thermally decomposed to yield acrylonitrile (vinyl cyanide, cyanoethylene, CH$_2$=CH—CN) with the liberation of hydrogen cyanide. The reaction is a general one whereby similar dicyanoalkanes may be pyrolyzed to yield corresponding cyanoalkenes or nitriles of unsaturated aliphatic carboxylic acids. Certain catalysts are particularly effective for effecting the particular reactions.

The reaction of succinonitrile to form acrylonitrile may be represented as:

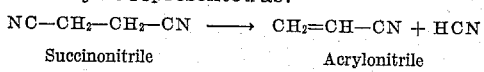

Succinonitrile     Acrylonitrile and, in general,

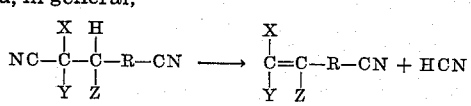

in which X, Y and Z represent hydrogen or hydrocarbon, or other substituent radicals, such as alkyl, aryl or halogen radicals, which may be the same or different, and R represents an alkenyl radical or may be absent. The reaction proceeds when the cyano groups are on adjacent carbon atoms (that is, when R is absent). Dicyanoalkanes in which the cyano groups are on other than adjacent carbon atoms are not as readily available or as easily prepared but they may and probably do react as typified by 1,3-dicyanopropane in the following equation:

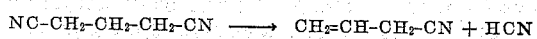

In accordance with the process of the present invention, succinonitrile or another of the specified dicyanoalkanes, is passed over a catalyst such as active carbon, alumina, bauxite, silica-alumina or the like at a temperature within the range of approximately 300° to approximately 500° C. The reaction is conducted at substantially atmospheric pressure but is favored by subatmospheric pressures, which may be used. Such subatmospheric pressures are preferably obtained by dilution of the dicyanoalkane with an inert gas such as nitrogen, methane or the like. The products, which comprise hydrogen cyanide and acrylonitrile or other cyanoalkene, are quenched or cooled rapidly and separated. The acrylonitrile or other cyanoalkene may be subsequently purified. Unconverted dicyanoalkane may be returned to the catalytic pyrolysis zone for further reaction. The liberated hydrogen cyanide may be used for the production of further quantities of dicyanoalkanes.

An example of a typical embodiment of the invention, for the production of acrylonitrile from succinonitrile, is the following:

Example

Succinonitrile is vaporized and preheated to approximately 400° C. It is then diluted with an approximately equal volume of a stream of nitrogen preheated to approximately 500° C. and the mixed stream is passed over a catalyst consisting of granular activated carbon that is maintained at a temperature of approximately 450° C. The catalyst is granular activated carbon having a particle size of approximately 8 to 10 mesh and is disposed in a cylindrical bed 30 cm. in length and 3 cm. in diameter. The flow rate is adjusted so as to give a contact period of approximately 0.5 second.

The effluent product stream is quenched rapidly in a refrigerated coil and the acrylonitrile is recovered by fractional distillation or other conventional method. The yield of substantially pure acrylonitrile is approximately 10 to 15% of the theoretical, based upon the succinonitrile charged and approximately 60 to 70%, based on the succinonitrile reacted.

In similar manner, cyanopropenes, propenyl cyanides or butenenitriles (three isomers,

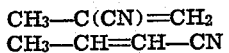

and

may be produced by pyrolysis of 1,2-dicyanopropane $(CH_3—CH(CN)—CH_2—CN)$, the dicyanopropane that results on chlorination of propylene and conversion of the propylene dichloride to a dicyano derivative. The cyanopropenes which may be produced in accordance with the process of the invention by pyrolysis of other dicyanopropanes are as follows:

1. $CH_3CH=CH—CN$ from $CH_3CH_2CH(CN)_2$
2. $CH_2=CH—CH_2—CN$ from $NC—CH_2—CH_2—CH_2—CN$
3. $CH_2=C(CH_3)—CN$ from $CH_3—C(CH_3)(CN)_2$ It is to be noted that 1,2-dicyanopropane yields three possible isomers and that two of these isomers may be produced from other dicyanopropanes (note 1 and 2 above), probably as the predominant cyanopropene. In the event that one of the two isomeric cyanopropenes that are produced from 1,2-dicyanopropane and can be produced from another dicyanopropane is desired in preference to the other products formed in the pyrolysis of 1,2-dicyanopropane, it may be advantageous to employ the other dicyanopropane as the starting material.

Various catalytic materials other than activated carbon, including Activated Alumina or bauxite, and silica-alumina catalysts of the type disclosed in the Hendrix and Chapman Patent No. 2,342,196, may be used for the production of cyanoalkenes from dicyanoalkanes.

Succinonitrile (dicyanoethane, butanedinitrile, or ethylene dicyanide) may be prepared by any of the conventional methods. It has been prepared by the reaction of ethylene bromide and potassium cyanide (Simpson, Annalen, 1861, vol. 118, page 374; ibid., 1862, vol. 121, page 154; Nevole and Tscherniak, Bull. soc. chim., 1878, series 2, vol. 30, page 101; and Fauconnier, Bull. soc. chim., 1888, series 2, vol. 50, page 214). Another process for its production from an ethylene dihalide and a finely-divided alkali-metal cyanide is described in U. S. Patent No. 2,211,240 and its preparation from ethylene dichloride and sodium cyanide in the presence initially of some succinonitrile is described in British Patent No. 333,989. Succinonitrile is also formed in small amounts in the pyrolysis of propionitrile at 675° C. (Winkler and Rabinovitch, Canadian J. Research, 1942, vol. 20, part B, pages 69 to 72). Other dicyanoalkanes can be prepared by analogous methods.

Since alkyl dihalides are readily produced by halogenation of olefins, the invention provides a convenient process for the production of nitriles of unsaturated aliphatic acids in which the double bond occurs on the carbon atom to which the cyano group is attached, from olefins and alkali-metal cyanides. Thus, ethylene is converted to ethylene dichloride; the ethylene dichloride is then reacted with sodium or potassium cyanide to yield succinonitrile, which is subsequently pyrolyzed, in accordance with the process of the invention, to acrylonitrile.

Inasmuch as the foregoing description comprises preferred embodiments of the invention, it is to be understood that the invention is not to be limited thereto and that its scope is to be determined solely by the appended claims.

I claim:
1. A process for the production of acrylonitrile which comprises passing succinonitrile over a catalyst selected from the group consisting of activated carbon, alumina, bauxite and alumina adsorbed on silica at a temperature of approximately 300° to 500° C., cooling the resulting gases and subsequently separating the acrylonitrile from the hydrogen cyanide and other products formed.

2. A process for the production of acrylonitrile which comprises passing succinonitrile together with an inert diluent gas at a temperature of approximately 450° C. over a catalyst selected from the group consisting of activated carbon, alumina, bauxite and alumina adsorbed on silica at such a rate that the contact period is approximately 0.5 second, quenching the products rapidly and subsequently separating acrylonitrile from the hydrogen cyanide and other products formed.

3. The process of claim 2 wherein the diluent gas is nitrogen and wherein equal volumes of said nitrogen and vaporized succinonitrile are used.

4. A process for the production of unsaturated nitriles which comprises passing a dinitrile containing not more than five carbon atoms together with an inert diluent gas over a catalyst selected from the group consisting of activated carbon, alumina, bauxite and alumina adsorbed on silica at a temperature of approximately 300°–500° C., quenching the product rapidly and subsequently separating the unsaturated nitrile from the hydrogen cyanide and other products formed.

GARDNER C. RAY.